United States Patent
Ramesh

(10) Patent No.: US 9,614,752 B2
(45) Date of Patent: Apr. 4, 2017

(54) MULTI-THREADED MULTI-PATH PROCESSING

(71) Applicant: Avaya Inc., Basking Ridge, NJ (US)

(72) Inventor: Deepak Ramesh, Bangalore (IN)

(73) Assignee: Avaya Inc., Santa Clara, CA (US)

( * ) Notice: Subject to any disclaimer, the term of this patent is extended or adjusted under 35 U.S.C. 154(b) by 194 days.

(21) Appl. No.: 14/077,101

(22) Filed: Nov. 11, 2013

(65) Prior Publication Data

US 2015/0131662 A1 May 14, 2015

(51) Int. Cl.
*H04L 12/707* (2013.01)
*H04L 12/751* (2013.01)
*H04L 12/741* (2013.01)
*H04L 12/46* (2006.01)

(52) U.S. Cl.
CPC .......... *H04L 45/24* (2013.01); *H04L 12/4616* (2013.01); *H04L 12/4633* (2013.01); *H04L 12/4641* (2013.01); *H04L 45/02* (2013.01); *H04L 45/74* (2013.01)

(58) Field of Classification Search
CPC ....................................... H04L 45/24
See application file for complete search history.

(56) References Cited

U.S. PATENT DOCUMENTS

| | | | |
|---|---|---|---|
| 9,049,030 B1* | 6/2015 | Pogde et al. | |
| 2010/0061269 A1* | 3/2010 | Banerjee et al. | 370/254 |
| 2010/0329253 A1* | 12/2010 | Srinivasan | H04L 47/2441 370/390 |
| 2013/0329546 A1* | 12/2013 | Wijnands | H04L 45/16 370/218 |
| 2014/0122704 A1* | 5/2014 | Wang | H04L 49/354 709/224 |
| 2014/0347975 A1* | 11/2014 | Yoshimoto et al. | 370/218 |
| 2015/0023352 A1* | 1/2015 | Yang et al. | 370/392 |

\* cited by examiner

*Primary Examiner* — Jason Mattis

(57) ABSTRACT

One or more implementations can include methods, systems and computer readable media for multi-threaded multipath processing. In some implementations, the method can include determining that a next hop for a destination includes a first next hop and a second next hop. The method can also include generating a first packet having a first destination address based on a nickname of a remote switch and on an identifier of a first path. The method can further include generating a second packet having a second destination address based on the nickname of the remote switch and on an identifier of a second path.

20 Claims, 4 Drawing Sheets

(114)

(116)

(118)

(120)

(122)

MULTI-THREADED MULTI-PATH PROCESSING

TECHNICAL FIELD

Embodiments relate generally to computer networks, and more particularly, to methods, systems and computer readable media for multi-threaded multi-path.

BACKGROUND

In some packet processing environments, L3 routing may be done in one processing thread, while provider backbone bridge (PBB) processing may be done in a different processing thread. There may be a need to pass certain information in the packet such that equal cost multi-path (ECMP) or multipathing can be achieved while the packet is being processed in two different and independent threads.

Embodiments were conceived in light of the above mentioned needs, problems and/or limitations, among other things.

SUMMARY

One or more embodiments can include methods, systems and computer readable media for elastic wireless control planes. In some implementations, the method can include determining that a next hop for a destination includes a first next hop and a second next hop. The method can also include generating a first packet having a first destination address based on a nickname of a remote switch and on an identifier of a first path. The method can further include generating a second packet having a second destination address based on the nickname of the remote switch and on an identifier of a second path.

The remote switch can include a backbone edge bridge. The first path can include a first (or primary) VLAN. The second path can include a second (or secondary) VLAN.

The method can also include encapsulating the first packet and the second packet according to an encapsulation scheme. The encapsulation scheme can include Mac-in-Mac (or IEEE 802.1ah) encapsulation. The method can further include generating a routing entry for both the first destination address and the second destination address in the remote switch.

Some implementations can include a system comprising one or more processors configured to perform operations. The operations can include determining that a next hop for a destination includes a first next hop and a second next hop. The operations can also include generating a first packet having a first destination address based on a nickname of a remote switch and on an identifier of a first path. The operations can further include generating a second packet having a second destination address based on the nickname of the remote switch and on an identifier of a second path.

The remote switch can include a backbone edge bridge. The first path can include a primary VLAN. The second path can include a secondary VLAN. The operations can also include encapsulating the first packet and the second packet according to an encapsulation scheme. The encapsulation scheme can include Mac-in-Mac encapsulation. The operations can further include generating a routing entry for both the first destination address and the second destination address in the remote switch.

Some implementations can include a nontransitory computer readable medium having stored thereon software instructions that, when executed by a processor of a wireless controller, cause the processor to perform operations. The operations can include determining that a next hop for a destination includes a first next hop and a second next hop. The operations can also include generating a first packet having a first destination address based on a nickname of a remote switch and on an identifier of a first path. The operations can further include generating a second packet having a second destination address based on the nickname of the remote switch and on an identifier of a second path.

The remote switch can include a backbone edge bridge. The first network can include a VLAN. The second network can include a VLAN. The operations can also include encapsulating the first packet and the second packet according to an encapsulation scheme. The encapsulation scheme can include Mac-in-Mac encapsulation. The operations can further include generating a routing entry for both the first destination address and the second destination address in the remote switch.

DETAILED DESCRIPTION

In general, some implementations can include support for multipathing when packets are processed in two separate threads (e.g., ECMP on an L3VSN network).

Figure 1A:
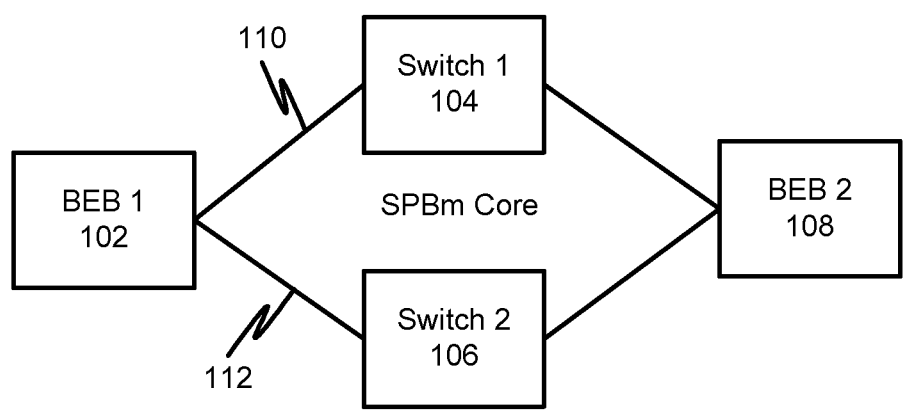
FIG. 1A is a diagram of an example network in accordance with at least one implementation.

FIG. 1A shows an example network 100 having a first BEB 102, a first switch 104, a second switch 106 and a second BEB 108. BEB 1 102 can be connected to Switch 1 104 via a primary VLAN 110 (e.g., B-VLAN-10). BEB 1 102 can also be connected to Switch 2 106 via a secondary VLAN 112 (e.g., B-VLAN-20).

BEB 1 102 can have a MAC of 00:00:01:00:00:00 and a nickname of 0.00.01. BEB 2 108 can have a MAC of 00:00:02:00:00:00 and a nickname of 0.00.02.

Figure 2:
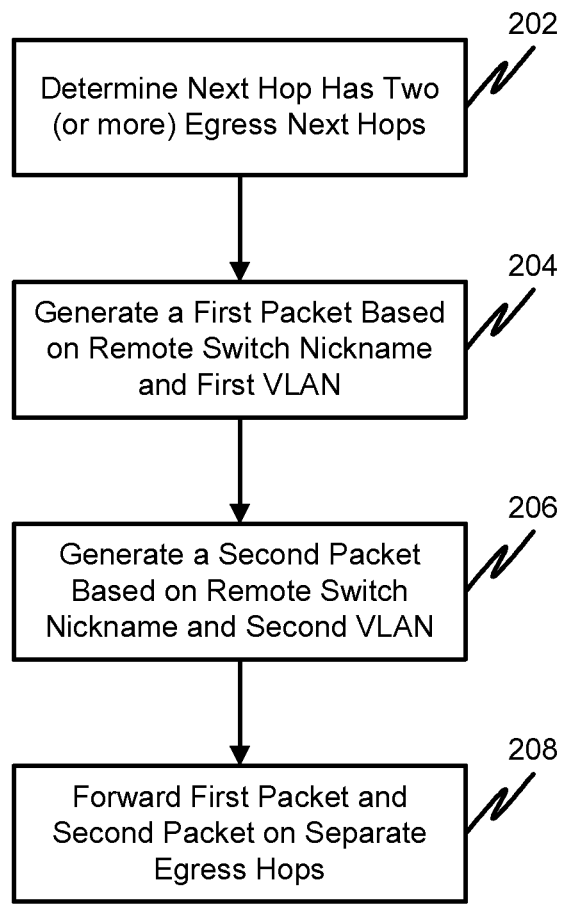
FIG. 2 is a flow chart of an example method for multi-threaded multipath processing in accordance with at least one implementation.

FIG. 2 is a flow chart of an example method for multi-threaded multipath processing. Processing begins at 202, where a system determines that a next hop has two egress next hop. For example, BEB 1 102 could determine that the next hop for a packet destined for BEB 2 108 includes two egress next hops (e.g., 110 and 112). Processing continues to 204.

At 204, a first packet is generated based on the remote switch nickname and the primary path (e.g., primary B-VLAN). For example, the first packet can include a destination MAC of 02:00:02:00:00:10, where the destination MAC is built according to the following format: 02:(remote BEB nickname):(Primary B-VLAN ID). The source MAC for the first packet can include the local BEB's MAC (e.g., the MAC of BEB 1 102). The VLAN can include the VRF_VLAN. Processing continues to 206.

At 206, a second packet is generated based on the remote switch nickname and the secondary path (e.g., secondary B-VLAN). For example, the second packet can include a destination MAC of 02:00:02:00:00:20, where the destination MAC is built according to the following format: 02: (remote BEB nickname):(Secondary B-VLAN ID). The source MAC for the second packet can include the local BEB's MAC (e.g., the MAC of BEB 1 102). The VLAN can include the VRF_VLAN. Processing continues to 208.

At 208, the first packet and second packet are forwarded on separate egress hops. For example, the first packet can be sent on B-VLAN-10 (110) and the second packet can be sent on B-VLAN-20 (112).

Figure 1B:
FIG. 1B is a diagram of packet formats for multi-threaded multipath processing in accordance with at least one implementation.
Figure 1B:
Figure 1B:
Figure 1B:
Figure 1B:

It will be appreciated that prior to be forwarded, the first and second packet can be encapsulated according to an encapsulation scheme such as a Mac-in-Mac encapsulation. For example, a customer packet could resemble 114 in FIG. 1B. The first and second packets could resemble 116 and 118, respectively, of FIG. 1B. After encapsulation, the first and second packets could resemble 120 and 122 of FIG. 1B.

Once the first and second packets are received at the remote switch (e.g., BEB 2 108), the switch can derive L3 VRF information based on the ISID in the packet. The switch can then derive, in a PBB processing thread, the L3 VRF VLAN based on the ISID and decapsulate and hand over the packet to an L3 processing thread. The PBB processing thread can set up a MAC entry for each of the two BMAC DAs as routable MACs so that the L3 processing thread can route packets for both of these MAC addresses.

In some implementations, customer MAC addresses are derived and passed between processing thread in such a way that ECMP can be achieved even when the packets are processed in different threads (e.g., L3 and PBB), which only act upon a pre-defined set of attributes in the packet. Also, the method described above can be used as a way to build customer MAC addresses in Mac-in-Mac packets for L3 VSN. Further, the derivation of MAC addresses based on BVLANs is extensible with the number of ECMP paths that may become available based on a greater number of B-VLANs.

Figure 3:
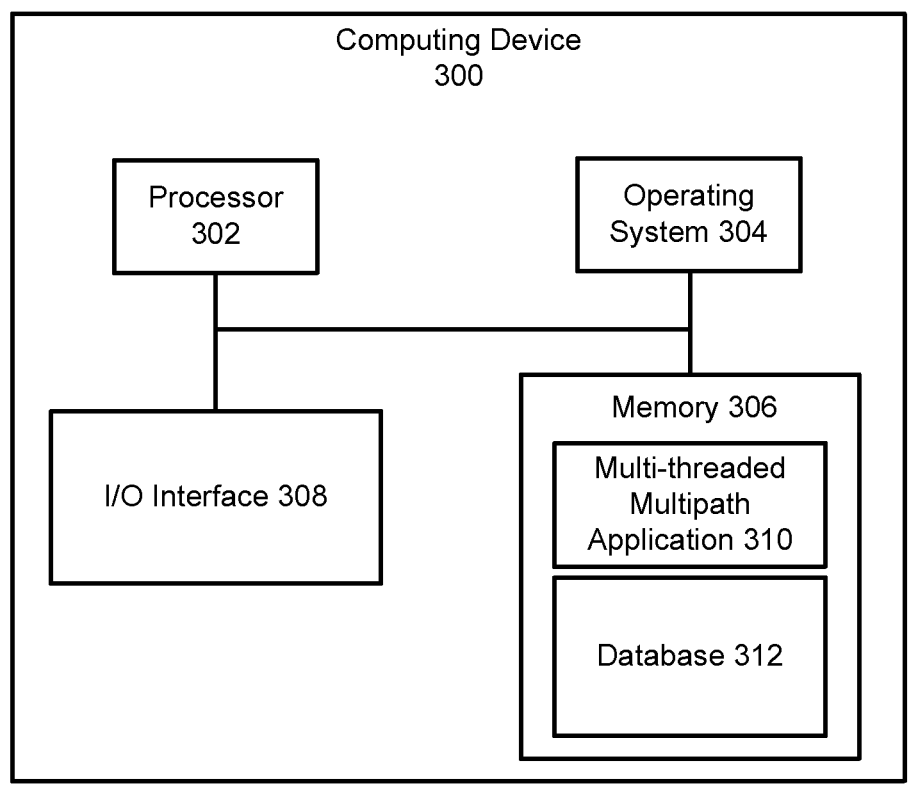
FIG. 3 is a diagram of an example computer system for multi-threaded multipath processing in accordance with at least one implementation.

FIG. 3 is a diagram of an example computer system 300 in accordance with at least one implementation. The computer 300 includes a processor 302, operating system 304, memory 306 and I/O interface 308. The memory 306 can include a multi-threaded multipath processing application 310 and a database 312 (e.g., for storing switch nicknames or the like).

In operation, the processor 302 may execute the application 310 stored in the memory 306. The application 310 can include software instructions that, when executed by the processor, cause the processor to perform operations for multi-threaded multipath processing in accordance with the present disclosure (e.g., performing one or more of steps 202-208).

The application program 310 can operate in conjunction with the database 312 and the operating system 304.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, the C#.NET framework, assembly or the like. The instructions can also comprise code and data objects provided in accordance with, for example, the Visual Basic™ language, or another structured, object-oriented, imperative or declarative programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for multi-threaded multipath processing.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A method comprising:
    determining that a next hop for a destination includes a first next hop and a second next hop;
    generating a first packet having a first destination address based on a nickname of a remote switch and on an identifier of a first path;
    generating a second packet having a second destination address based on the nickname of the remote switch and on an identifier of a second path;
    forwarding both the first packet and the second packet to the remote switch on separate egress hops; and
    processing the first packet in a first processing thread at the remote switch and processing the second packet in a second processing thread different from the first processing thread at the remote switch, wherein the processing includes deriving customer MAC addresses and passing the customer MAC addresses between the first processing thread and the second processing thread to accomplish equal cost multi-path (ECMP) as the packets are processed in different threads.

2. The method of claim 1, wherein the remote switch is a backbone edge bridge.

3. The method of claim 1, wherein the first path is a primary VLAN.

4. The method of claim 1, wherein the second path is a secondary VLAN.

5. The method of claim 1, further comprising determining that a next hop for a destination includes a plurality of next hops.

6. The method of claim 1, wherein an encapsulation scheme for the first packet and the second packet is Mac-in-Mac encapsulation.

7. The method of claim 1, further comprising generating a routing entry for both the first destination address and the second destination address in the remote switch.

8. A system comprising one or more processors configured to perform operations including:
    determining that a next hop for a destination includes a first next hop and a second next hop;
    generating a first packet having a first destination address based on a nickname of a remote switch and on an identifier of a first path;
    generating a second packet having a second destination address based on the nickname of the remote switch and on an identifier of a second path;
    forwarding both the first packet and the second packet to the remote switch on separate egress hops; and
    processing the first packet in a first processing thread at the remote switch and processing the second packet in a second processing thread different from the first processing thread at the remote switch, wherein the processing includes deriving customer MAC addresses and passing the customer MAC addresses between the first processing thread and the second processing thread to accomplish equal cost multi-path (ECMP) as the packets are processed in different threads.

9. The system of claim 8, wherein the remote switch is a backbone edge bridge.

10. The system of claim 8, wherein the first path is a primary VLAN.

11. The system of claim 8, wherein the second path is a secondary VLAN.

12. The system of claim 8, wherein the operations further comprise encapsulating the first packet and the second packet according to an encapsulation scheme.

13. The system of claim 12, wherein the encapsulation scheme is Mac-in-Mac encapsulation.

14. The system of claim 8, wherein the operations further comprise generating a routing entry for both the first destination address and the second destination address in the remote switch.

15. A nontransitory computer readable medium having stored thereon software instructions that, when executed by a processor of a wireless controller, cause the processor to perform operations including:
    determining that a next hop for a destination includes a first next hop and a second next hop;
    generating a first packet having a first destination address based on a nickname of a remote switch and on an identifier of a first path;
    generating a second packet having a second destination address based on the nickname of the remote switch and on an identifier of a second path;
    forwarding both the first packet and the second packet to the remote switch on separate egress hops; and
    processing the first packet in a first processing thread at the remote switch and processing the second packet in a second processing thread different from the first processing thread at the remote switch, wherein the processing includes deriving customer MAC addresses and passing the customer MAC addresses between the first processing thread and the second processing thread to accomplish equal cost multi-path (ECMP) as the packets are processed in different threads.

16. The nontransitory computer readable medium of claim 15, wherein the remote switch is a backbone edge bridge.

17. The nontransitory computer readable medium of claim 15, wherein the first path is a primary VLAN.

18. The nontransitory computer readable medium of claim 15, wherein the second path is a secondary VLAN.

19. The nontransitory computer readable medium of claim 15, wherein the operations further comprise encapsulating the first packet and the second packet according to an encapsulation scheme.

20. The nontransitory computer readable medium of claim 19, wherein the encapsulation scheme is Mac-in-Mac encapsulation, and wherein the operations further comprise generating a routing entry for both the first destination address and the second destination address in the remote switch.

* * * * *